United States Patent
Chyi et al.

(10) Patent No.: US 10,171,894 B2
(45) Date of Patent: Jan. 1, 2019

(54) METHOD FOR ADJUSTING RECEPTION PARAMETER OF OPTICAL LINE TERMINAL AND OPTICAL LINE TERMINAL

(71) Applicant: Huawei Technologies Co., Ltd., Shenzhen (CN)

(72) Inventors: Ning Chyi, Taipei (TW); Li-An Ho, Taipei (TW); Zhijing Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/798,854

(22) Filed: Oct. 31, 2017

(65) Prior Publication Data
US 2018/0124481 A1    May 3, 2018

(30) Foreign Application Priority Data
Oct. 31, 2016  (CN) .......................... 2016 1 0967622

(51) Int. Cl.
*H04J 14/00* (2006.01)
*H04Q 11/00* (2006.01)

(52) U.S. Cl.
CPC . *H04Q 11/0062* (2013.01); *H04Q 2011/0086* (2013.01); *H04Q 2011/0088* (2013.01)

(58) Field of Classification Search
CPC .. H04B 10/272; H04B 10/27; H04B 10/6932; H04Q 11/0067; H04Q 2011/0064; H04Q 2011/0084; H04Q 11/0062; H04Q 2011/0086; H04Q 2011/0088; H04L 25/0262

USPC .................................... 398/45, 52, 66, 67, 72
See application file for complete search history.

(56) References Cited

U.S. PATENT DOCUMENTS

| | | | | |
|---|---|---|---|---|
| 8,139,950 B2* | 3/2012 | Niibe | ................ | H04Q 11/0067 398/100 |
| 8,244,125 B2* | 8/2012 | Biegert | ............. | H04Q 11/0067 398/12 |
| 8,503,891 B2* | 8/2013 | Mashimo | ............. | H04B 10/272 398/202 |
| 8,654,647 B2* | 2/2014 | Yu | ........................ | H04L 5/1446 370/236 |

(Continued)

*Primary Examiner* — Hibret Woldekidan
(74) *Attorney, Agent, or Firm* — Leydig, Voit & Mayer, Ltd.

(57) ABSTRACT

This application discloses a method, including: determining a transmission rate of a to-perform-sending optical network unit (ONU); generating a reset signal before the to-perform-sending ONU sends an optical signal, where the reset signal is used to trigger the OLT to perform a reset operation; adjusting a signal characteristic of the reset signal according to the transmission rate, to generate an adjusted signal; extracting a signal characteristic of the adjusted signal, and generating a first signal and a second signal according to the signal characteristic of the adjusted signal, where the first signal indicates the reset signal, and the second signal indicates the transmission rate of the to-perform-sending ONU; performing the reset operation according to the first signal; and after the reset operation is completed, adjusting the reception parameter of the optical line terminal OLT according to the second signal.

10 Claims, 5 Drawing Sheets

(56) References Cited

U.S. PATENT DOCUMENTS

| | | | | |
|---|---|---|---|---|
| 8,724,995 B2* | 5/2014 | Kazawa | ............... | H04L 12/44 |
| | | | | 398/154 |
| 8,861,954 B2* | 10/2014 | Sugawa | ............ | H04B 10/272 |
| | | | | 398/34 |
| 8,891,973 B2* | 11/2014 | Tanaka | ............. | H04B 10/272 |
| | | | | 398/155 |
| 9,104,793 B2* | 8/2015 | Iyer | ..................... | G06F 13/36 |
| 9,391,734 B2* | 7/2016 | Sugawa | ............... | H04J 14/08 |
| 2011/0129235 A1* | 6/2011 | Le | .................... | H04B 10/693 |
| | | | | 398/208 |
| 2011/0222866 A1* | 9/2011 | Mashimo | .......... | H04B 10/272 |
| | | | | 398/202 |
| 2011/0310905 A1* | 12/2011 | Yu | ........................ | G06F 13/00 |
| | | | | 370/401 |
| 2012/0008954 A1* | 1/2012 | Tanaka | ............. | H04B 10/272 |
| | | | | 398/67 |
| 2012/0257892 A1* | 10/2012 | Boyd | .................. | H04L 47/22 |
| | | | | 398/58 |
| 2013/0058656 A1* | 3/2013 | Sakai | ................. | H04J 3/1694 |
| | | | | 398/66 |
| 2014/0181422 A1* | 6/2014 | Hepler | ................. | H04L 49/90 |
| | | | | 711/148 |
| 2014/0280791 A1* | 9/2014 | DeCusatis | ............ | H04L 69/22 |
| | | | | 709/220 |
| 2016/0094311 A1* | 3/2016 | Su | ........................ | G06F 11/10 |
| | | | | 714/776 |

\* cited by examiner

METHOD FOR ADJUSTING RECEPTION PARAMETER OF OPTICAL LINE TERMINAL AND OPTICAL LINE TERMINAL

CROSS-REFERENCE TO RELATED APPLICATION

This application claims priority to Chinese Patent Application No. 201610967622.0, filed on Oct. 31, 2016, which is hereby incorporated by reference in its entirety.

TECHNICAL FIELD

The present disclosure relates to the field of optical communications, and in particular, to a method for adjusting a reception parameter of an optical line terminal, and an optical line terminal.

BACKGROUND

Currently, an NG-PON (Next Generation Passive Optical Network) is a research hotspot in the field of communications technologies. The NG-PON includes a 10 G PON (Passive Optical Network), a 10 G symmetric PON, and the like. An OLT (Optical Line Termination) is a central office device in a PON communications system, and is mainly used to: send Ethernet data to an ONU (Optical Network Unit) in a broadcast manner, perform a ranging process, and allocate a sending slot to the ONU, that is, control a start moment and an end moment of sending data by the ONU. The ONU is user equipment in the PON communications system, and is mainly used to: receive the Ethernet data broadcast by the OLT, respond to the ranging process performed by the OLT, and send data according to the sending slot configured by the OLT. One of current research issues is how to make the NG-PON compatible with an ONU (Optical Network Unit) in an EPON (Ethernet Passive Optical Network) or a GPON (Gigabit Passive Optical Network) deployed in a previous-generation technology. In this case, an OLT in the NG-PON needs to receive not only a signal sent by an ONU in the NG-PON, but also a signal sent by an ONU in the EPON.

Each ONU in the PON communications system performs access by means of time division multiple access. A signal received by the OLT is unexpected. For receiving of an unexpected signal, because rates of all unexpected packets are different, signal amplitudes and phases of all the unexpected packets are different from one another. Therefore, an optical receiving component of the OLT determines a rate of the ONU according to a signal characteristic of a received unexpected packet, and then adaptively adjusts a reception parameter of the optical receiving component according to the rate.

In the PON communications system, a requirement for a time sequence of data receiving is extremely high. However, duration of an unexpected packet is quite short. It is quite difficult for the OLT to detect a rate of the unexpected packet and then adjust a reception parameter of the optical receiving component in such a short time. Consequently, the OLT is likely to fail to adjust the reception parameter of the optical receiving component in time when the unexpected packet arrives, and therefore cannot correctly receive data.

SUMMARY

Embodiments of the present disclosure provide a method for adjusting a reception parameter of an optical line terminal, and an optical line terminal, so as to resolve a prior-art problem that a reception parameter cannot be adjusted in time when ONUs with multiple rates send data.

According to a first aspect, this application provides a method for adjusting a reception parameter of an optical line terminal, including the following:

The OLT first determines a transmission rate of a to-perform-sending ONU. The transmission rate includes a level signal, and the to-perform-sending ONU is an ONU that is to perform uplink sending and that actually has not performed uplink sending. The OLT manages multiple ONUs, and the multiple ONUs are corresponding to at least two transmission rates. For example, the OLT manages four ONUs: an ONU 1, an ONU 2, an ONU 3, and an ONU 4. Transmission rates of the ONU 1 and the ONU 2 are 10 G, and transmission rates of the ONU 3 and the ONU 4 are 5 G. According to working statuses, ONUs that are to perform sending may be classified into an ONU in an online state and an ONU in an offline state. The OLT may determine, according to pre-configured slot configuration information, a transmission rate of the ONU in an online state. When the ONU in an offline state needs to go online, the OLT may determine, according to a transmission rate associated with a current network access time interval, a transmission rate of the ONU in an offline state. Some parts of an optical receiving component of the OLT include capacitors. The capacitor has a charge accumulation effect. In this case, the OLT is likely to fail to set a correct determining threshold after the OLT receives an uplink optical signal. Therefore, the OLT sends a reset signal to the optical receiving component each time after receiving an uplink optical signal. The optical receiving component includes but is not limited to a photoelectric detector PD, a trans-impedance amplifier TIA, and an amplitude limiting amplifier. Then, the OLT adjusts a signal characteristic of the reset signal according to the transmission rate, to obtain an adjusted signal. The signal characteristic includes but is not limited to one or more of an amplitude, a phase, a bit width, or a quantity of impulse signals. The OLT extracts a signal characteristic of the adjusted signal, and restores the reset signal and obtains the transmission rate of the to-perform-sending ONU, according to the signal characteristic of the adjusted signal. The signal characteristic of the reset signal and the signal characteristic of the adjusted signal are the same in terms of characteristics. For example, the signal characteristic of the reset signal is an amplitude, and the signal characteristic of the adjusted signal is also an amplitude; or the signal characteristic of the reset signal is a bit width, and the signal characteristic of the adjusted signal is also a bit width. The OLT performs a reset operation according to the reset signal, and after completing the reset operation, adjusts the reception parameter according to the transmission rate. For example, the TIA adjusts impedance and bandwidth, and the amplitude limiting amplifier adjusts a gain and bandwidth, so that a reception parameter of a related part of the optical receiving component matches the transmission rate. The to-perform-sending ONU sends an optical signal to the OLT when a sending moment of the to-perform-sending ONU arrives, and the OLT receives the optical signal.

In the foregoing embodiment, when ONUs with multiple transmission rates coexist, before the ONU sends the uplink optical signal, the OLT can adjust the reception parameter to match the transmission rate. In this way, the OLT can correctly receive the optical signal sent by the ONU, thereby improving optical signal receiving reliability.

In a possible implementation of this aspect, the adjusting a signal characteristic of the reset signal according to the transmission rate, to generate an adjusted signal includes:

adjusting, by a MAC layer chip, the signal characteristic of the reset signal according to the transmission rate, to generate the adjusted signal.

In a possible implementation of this aspect, the adjusting, by a MAC layer chip, the signal characteristic of the reset signal according to the transmission rate, to generate the adjusted signal includes: pre-storing, by the OLT, a first mapping relationship between a transmission rate and an amplitude, and querying, by the MAC layer chip in the first mapping relationship according to the determined transmission rate of the to-perform-sending ONU, an amplitude corresponding to the transmission rate, and adjusting an amplitude of the reset signal to the queried amplitude, to generate the adjusted signal.

In the foregoing embodiment, the transmission rate is represented by adjusting the amplitude of the reset signal. The adjustment method is simple and has a strong capability of resisting a delay effect, and less bandwidth is occupied.

In a possible implementation of this aspect, the loading, by a MAC layer chip, the transmission rate onto the reset signal to generate the adjusted signal includes: pre-storing, by the OLT, a second mapping relationship between a transmission rate and a bit width, and querying, by the MAC layer chip in the second mapping relationship according to the determined transmission rate of the to-perform-sending ONU, a bit width corresponding to the transmission rate, and adjusting a bit width of the reset signal to the queried bit width, to generate the adjusted signal.

In the foregoing embodiment, the transmission rate is represented by adjusting the bit width of the reset signal. The adjustment method is simple and has a strong capability of resisting impulse noise.

In a possible implementation of this aspect, the loading, by a MAC layer chip, the transmission rate onto the reset signal to generate the adjusted signal includes: pre-storing, by the OLT, a third mapping relationship between a transmission rate and an impulse quantity, and querying, by the MAC layer chip in the third mapping relationship according to the determined transmission rate of the to-perform-sending ONU, an impulse quantity corresponding to the transmission rate, and adjusting an impulse quantity of the reset signal to the queried impulse quantity, to generate the adjusted signal.

In the foregoing embodiment, the transmission rate is represented by adjusting the impulse quantity of the reset signal, and therefore a capability of resisting noise is strong.

In a possible implementation of this aspect, the step of extracting a signal characteristic of the adjusted signal, and restoring, according to the signal characteristic of the adjusted signal, the reset signal and the transmission rate of the to-perform-sending ONU includes: receiving, by a physical layer chip, the adjusted signal sent by the MAC layer chip; extracting, by the physical layer chip, the signal characteristic of the adjusted signal, where the signal characteristic includes but is not limited to a signal amplitude, a signal phase, a signal bit width, or an impulse quantity; and restoring, according to the signal characteristic of the adjusted signal, the reset signal and the transmission rate of the to-perform-sending ONU.

In a possible implementation of this aspect, the MAC layer chip sends the generated adjusted signal to the physical layer chip, and the physical layer chip extracts an amplitude of the adjusted signal, and determines, according to the first mapping relationship, a transmission rate corresponding to the amplitude. Therefore, the physical layer chip obtains the transmission rate of the to-perform-sending ONU. It should be noted that the amplitude of the adjusted signal may change in a transmission process, and therefore the amplitude of the adjusted signal received by the physical layer chip is allowed to fall within a specific error range. In the foregoing embodiment, the MAC layer chip adjusts the amplitude of the reset signal according to the transmission rate. The adjustment method is relatively simple, and less bandwidth is occupied.

In a possible implementation of this aspect, the MAC layer chip sends the generated adjusted signal to the physical layer chip, and the physical layer chip extracts a bit width of the adjusted signal, and queries, according to the second mapping relationship, a transmission rate corresponding to the bit width. Therefore, the physical layer chip obtains the transmission rate of the to-perform-sending ONU. It should be noted that the bit width of the adjusted signal may change in a transmission process, and therefore the bit width of the adjusted signal received by the physical layer chip is allowed to fall within a specific error range.

In the foregoing embodiment, the MAC layer chip adjusts the bit width of the reset signal according to the transmission rate. The adjustment method is simple and has a specific capability of resisting noise.

In a possible implementation of this aspect, the MAC layer chip sends the generated adjusted signal to the physical layer chip, and the physical layer chip receives the adjusted signal, extracts an impulse quantity of the adjusted signal, and queries, according to the third mapping relationship, a transmission rate corresponding to the impulse quantity. Therefore, the physical layer chip obtains the transmission rate of the to-perform-sending ONU.

In the foregoing embodiment, the transmission rate is represented by adjusting the impulse quantity by the MAC layer chip, and the physical layer chip can accurately detect the impulse quantity. Therefore, a capability of resisting noise is strong.

In a possible implementation of this aspect, the adjusting, by the ONU, a signal characteristic of the reset signal according to the transmission rate, to generate an adjusted signal includes: querying, according to a preset mapping relationship, a signal characteristic associated with the transmission rate, and adjusting the signal characteristic of the reset signal according to the associated signal characteristic, to generate the adjusted signal, where the associated signal characteristic includes one or more of an amplitude, a bit width, or an impulse quantity.

In a possible implementation of this aspect, the optical receiving component includes the TIA, and the TIA is configured to convert a current signal sent by the photoelectric detector into a voltage signal. The TIA first receives the reset signal sent by the physical layer chip, and the TIA performs a reset operation according to the reset signal. Then, the TIA receives a rate indication signal sent by the physical layer chip, and adjusts the impedance and the bandwidth according to the transmission rate indicated by the rate indication signal. A higher transmission rate indicates lower impedance and higher bandwidth of the TIA. On the contrary, a lower transmission rate indicates higher impedance and lower bandwidth of the TIA.

In a possible implementation of this aspect, the determining, by the MAC layer chip, the transmission rate of the to-perform-sending ONU includes: when the to-perform-sending ONU is in an online state, obtaining, by the MAC layer chip according to pre-stored slot configuration information, the transmission rate of the to-perform-sending ONU. The slot configuration information represents duration, a location, and a corresponding transmission rate of a sending slot of each ONU in an online state. For example, slot configuration information of the ONU 1 indicates that duration is 5 ms, a location is the first slot, and a transmission rate is 5 G. Therefore, the ONU 1 can send an optical signal only in duration specified for the first slot. The OLT controls, by using the slot configuration information, the ONU to access a network by means of time division multiple access. Therefore, the MAC layer chip can obtain, according to the slot configuration information, the transmission rate of the to-perform-sending ONU. When the to-perform-sending ONU is one of ONUs in an offline state, and the ONU in an offline state needs to go online, the MAC layer chip may set a network access time interval, and only an ONU with a designated transmission rate is allowed to access a network in the network access time interval. For example, the MAC layer chip sets a start moment of the network access time interval to t0 and an end moment of the network access time interval to t1. The MAC layer chip broadcasts a network access instruction message to the multiple ONUs in an offline state. The network access instruction message carries a transmission rate, the start moment t0 of the network access time interval, and the end moment t1 of the network access time interval. After receiving the network access instruction message, an ONU in an offline state determines whether the transmission rate carried in the network access instruction message is the same as a transmission rate of the ONU, and may access a network by means of contention in the network access time interval: t0 to t1. The MAC layer chip determines, according to a transmission rate corresponding to the network access time interval, the transmission rate of the to-perform-sending ONU.

According to a second aspect, this application provides an optical line terminal, including an optical receiving component, a MAC layer chip, and a physical layer chip, where the MAC layer chip is configured to: determine a transmission rate of a to-perform-sending ONU, where the transmission rate includes a level signal; generate a reset signal; adjust a signal characteristic of the reset signal according to the transmission rate, to generate an adjusted signal; and send the adjusted signal to the physical layer chip, where the MAC layer chip may transmit the adjusted signal to the physical layer chip by using a pin used to transmit a reset signal, so that an extra pin of the MAC layer chip can be prevented from being occupied;

the physical layer chip is configured to: receive the adjusted signal sent by the physical layer chip, extract a signal characteristic of the adjusted signal, restore, according to the signal characteristic of the adjusted signal, the reset signal and the transmission rate of the to-perform-sending ONU, generate a rate indication signal according to the transmission rate, send the reset signal to the optical receiving component, and send the rate indication signal to the optical receiving component after the optical receiving component completes a reset operation; and the optical receiving component is configured to: receive the reset signal and the rate indication signal that are sent by the physical layer chip, perform the reset operation according to the reset signal, after completing the reset operation, adjust a reception parameter according to the transmission rate, and receive an optical signal sent by the to-perform-sending ONU.

In the foregoing embodiment, when ONUs with multiple transmission rates coexist, before the ONU sends the uplink optical signal, the MAC layer chip can adjust the signal characteristic of the reset signal, to generate the adjusted signal for representing the transmission rate of the to-perform-sending ONU. In this way, the adjusted signal can be transmitted by using the pin originally used to transmit a reset signal, and no extra chip pin is occupied. The physical layer chip demodulates the adjusted signal to obtain the reset signal and the signal that indicates the transmission rate. The optical receiving component adjusts the reception parameter according to the transmission rate, which is notified by the physical layer chip, of the to-perform-sending ONU, so that the reception parameter matches the transmission rate. In this way, the OLT can correctly receive the optical signal sent by the ONU, thereby improving optical signal receiving reliability.

In a possible implementation of this aspect, the MAC layer chip includes a signal generator, a signal modulator, and a transmitter, the physical layer chip includes a receiver, a signal demodulator, and a transmitter, and the optical receiving component includes a photoelectric detector and a trans-impedance amplifier TIA;

the signal generator of the MAC layer chip is configured to: determine the transmission rate of the to-perform-sending ONU, and generate the reset signal;

the signal modulator of the MAC layer chip is configured to adjust the signal characteristic of the reset signal according to the transmission rate, to generate the adjusted signal;

the transmitter of the MAC layer chip is configured to send the adjusted signal to the receiver of the physical layer chip;

the receiver of the physical layer chip is configured to receive the adjusted signal;

the signal demodulator of the physical layer chip is configured to: extract the signal characteristic of the adjusted signal, and restore, according to the signal characteristic of the adjusted signal, the reset signal and the transmission rate of the to-perform-sending ONU;

the transmitter of the physical layer chip is configured to: generate the rate indication signal according to the transmission rate, send the reset signal to the TIA of the optical receiving component, and send the rate indication signal to the TIA of the optical receiving component after the TIA of the optical receiving component completes a reset operation;

the TIA of the optical receiving component is configured to receive the reset signal and the rate indication signal, perform the reset operation according to the reset signal, and after completing the reset operation, adjust the reception parameter according to the transmission rate; and the photoelectric detector of the optical receiving component is configured to: receive the optical signal sent by the to-perform-sending ONU, convert the optical signal into an electrical signal, and send the electrical signal to the TIA.

In a possible implementation of this aspect, the modulator of the MAC layer chip is configured to:

query, according to a preset first mapping relationship, an amplitude associated with the transmission rate, and adjust an amplitude of the reset signal according to the associated amplitude, to generate the adjusted signal; or query, according to a preset second mapping relationship, a bit width associated with the transmission rate, and adjust a bit width of the reset signal according to the associated bit width, to generate the adjusted signal; or query, according to a preset third mapping relationship, an impulse quantity associated with the transmission rate, and adjust an impulse quantity of the reset signal according to the associated impulse quantity, to generate the adjusted signal.

In a possible implementation of this aspect, the modulator of the MAC layer chip is configured to:

query, according to a preset mapping relationship, a signal characteristic associated with the transmission rate, and adjust the signal characteristic of the reset signal according to the associated signal characteristic, to generate the adjusted signal, where the associated signal characteristic includes one or more of an amplitude, a bit width, or an impulse quantity.

In a possible implementation of this aspect, the signal demodulator of the physical layer chip is configured to:

extract an amplitude of the adjusted signal, and query, according to the first mapping relationship, a transmission rate associated with the amplitude of the adjusted signal, so as to restore the reset signal and obtain the transmission rate of the to-perform-sending ONU;

extract a bit width of the adjusted signal, and query, according to the second mapping relationship, a transmission rate associated with the bit width of the adjusted signal, so as to restore the reset signal and obtain the transmission rate of the to-perform-sending ONU; or extract an impulse quantity of the adjusted signal, and query, according to the third mapping relationship, a transmission rate associated with the impulse quantity of the adjusted signal, so as to restore the reset signal and obtain the transmission rate of the to-perform-sending ONU.

In a possible implementation of this aspect, the demodulator of the physical layer chip is configured to:

extract the signal characteristic of the adjusted signal, and query, according to a mapping relationship, a transmission rate associated with the signal characteristic, so as to generate a first signal and a second signal, where the signal characteristic of the adjusted signal is one or more of an amplitude, a bit width, or an impulse quantity.

In a possible implementation of this aspect, the reception parameter includes impedance and bandwidth of the TIA.

In a possible implementation of this aspect, the signal generator of the MAC layer chip is configured to:

when the to-perform-sending ONU is in an online state, determine, according to preset slot configuration information, the transmission rate of the to-perform-sending ONU; or when an offline ONU needs to go online, determine a network access time interval within which a current moment falls, and determine, according to preset network access configuration information, a transmission rate that is associated with the network access time interval and that is of the to-perform-sending ONU.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3a-1 and FIG. 3a-2 are another schematic flowchart of a method for adjusting a reception parameter of an optical line terminal according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
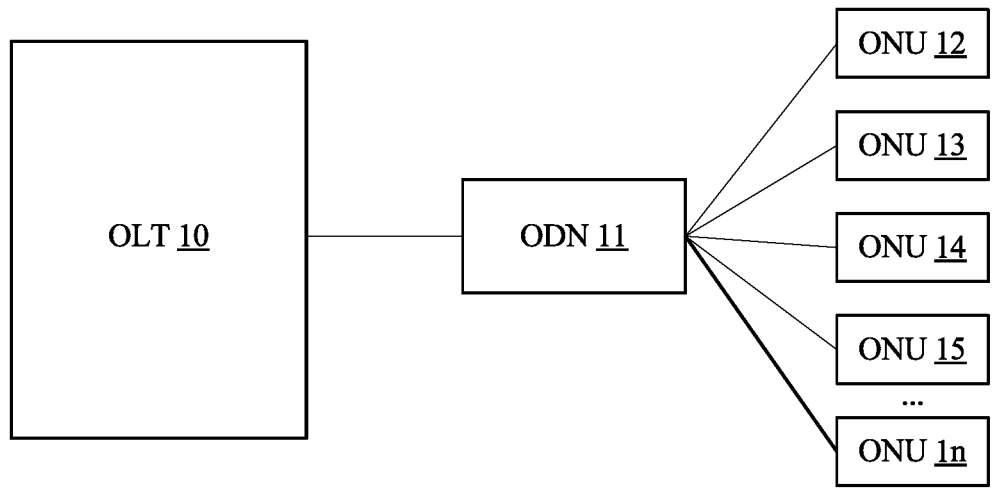
FIG. 1 is a schematic structural diagram of a PON communications system according to an embodiment of the present invention.

Referring to FIG. 1, FIG. 1 is a schematic structural diagram of a PON communications system according to an embodiment of the present invention. The PON communications system includes an optical line terminal OLT 10, an optical distribution network ODN 11, and optical network units ONUs 12 to 1 n. The OLT 10 may be connected to one or more ODNs. For example, the OLT 10 is connected to one ODN: the ODN 11 in FIG. 1. The ODN 11 is a passive optical splitting component, and is configured to: split an optical signal sent by the OLT 10 in downlink, and transmit signals after splitting to the ONUs 12 to 1 n; and aggregate optical signals sent by the ONUs 12 to 1 n in uplink, and transmit a signal obtained after aggregation to the OLT 10. Data is transmitted between the OLT 10 and the ONUs 12 to 1 n in the following manners: In an uplink direction, the ONUs 12 to 1 n send optical signals to the OLT 10 by means of TDMA (Time Division Multiple Access, time division multiple access), and in a downlink direction, the OLT 10 sends an optical signal to the ONUs 12 to 1 n in a broadcast manner.

The PON communications system in this application has the following working principle: An OLT determines a transmission rate of a to-perform-sending ONU. The transmission rate includes a level signal, the to-perform-sending ONU is an ONU that is to perform uplink sending, and uplink sending for two consecutive times may be performed by a same ONU, or by different ONUs. The OLT generates a reset signal before receiving an optical signal sent by the to-perform-sending ONU. For example, the OLT generates the reset signal after receiving a last optical signal. The reset signal is used to instruct an optical receiving component of the OLT to perform a reset operation. Because the OLT cannot directly receive transmission rate information of the to-perform-sending ONU, the transmission rate information of the to-perform-sending ONU is loaded onto the reset signal in this application. Specifically, the OLT adjusts a signal characteristic of the reset signal according to the transmission rate of the to-perform-sending ONU. The signal characteristic includes but is not limited to one or more of an amplitude, a phase, or a bit width. The OLT generates an adjusted signal after adjusting the signal characteristic of the reset signal. The OLT extracts a signal characteristic of the adjusted signal, and generates a first signal and a second signal according to the signal characteristic of the adjusted signal. The first signal indicates the reset signal, and the second signal indicates the transmission rate of the to-perform-sending ONU. The first signal and the second signal may include a signal that is at a high level in specific duration and that is at a low level in duration other than the specific duration. Duration in which the first signal is at a high level is a fixed value. For example, the duration in which the first signal is a high-level signal is 6.4 ns. Duration in which the second signal is a high-level signal may be different from the duration in which the first signal is a high-level signal. The duration in which the second signal is a high-level signal may vary with the transmission rate. For example, when the transmission rate is 5 G, the duration in which the second signal is a high-level signal is 12.8 ns; or when the transmission rate is 10 G, the duration in which the second signal is a high-level signal is 19.2 ns. The OLT performs a reset operation according to the first signal, and adjusts a reception parameter of the OLT according to the second signal. The reception parameter of the OLT includes but is not limited to gains and bandwidth of a transimpedance amplifier TIA and an amplitude limiting amplifier. After adjusting the reception parameter of the OLT, the OLT receives the optical signal sent by the to-perform-sending ONU. In this way, when the optical signal sent by the to-perform-sending ONU arrives, the reception parameter of the OLT can match the transmission rate of the to-perform-sending ONU, so that the OLT can correctly receive the optical signal, thereby improving reliability.

Figure 2:
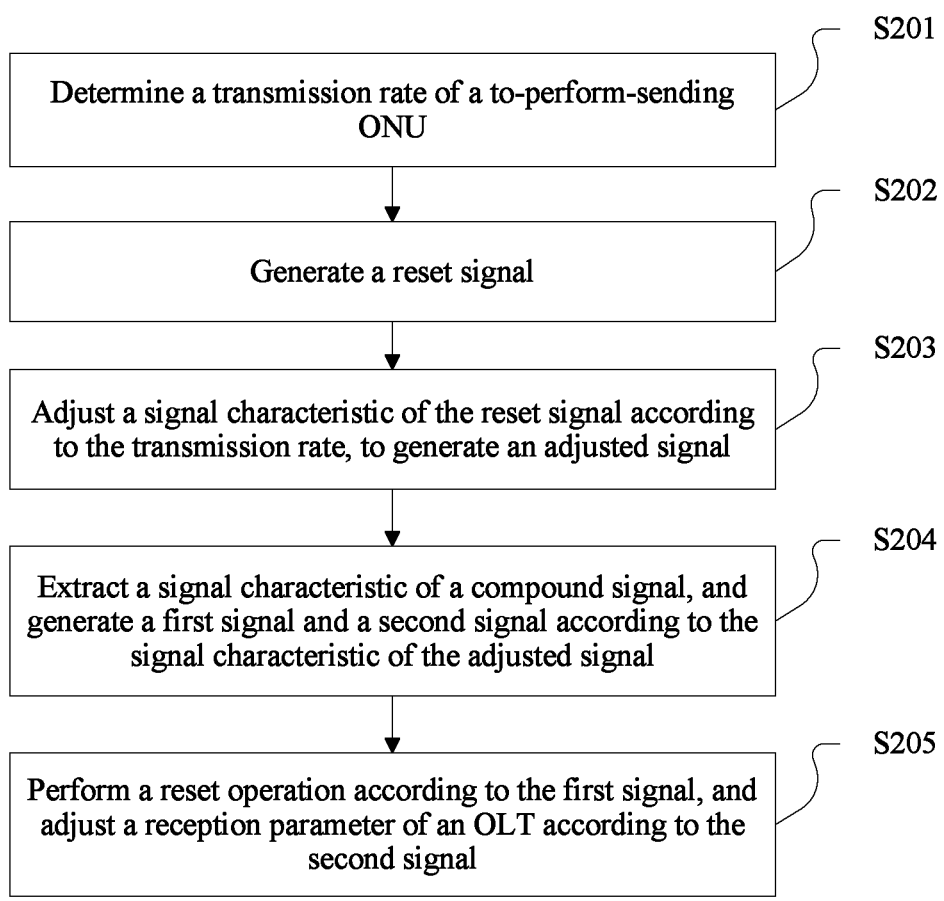
FIG. 2 is a schematic flowchart of a method for adjusting a reception parameter of an optical line terminal according to an embodiment of the present invention.

Referring to FIG. 2, FIG. 2 is a method for adjusting a reception parameter of an optical line terminal according to an embodiment of the present invention. In this embodiment of the present invention, the method includes the following steps.

S201. Determine a Transmission Rate of a to-Perform-Sending ONU.

Specifically, the to-perform-sending ONU represents an ONU that is to perform uplink sending, that is, a to-perform-sending ONU next time and that actually has not performed uplink sending. An OLT is associated with multiple ONUs, and the multiple ONUs have at least two transmission rates. Before an optical signal sent by the to-perform-sending ONU arrives, the OLT determines the transmission rate of the to-perform-sending ONU. The transmission rate includes a level signal.

S202. Generate a Reset Signal Before the to-Perform-Sending ONU Sends an Optical Signal.

Specifically, some parts of an optical receiving component of the OLT include capacitors. The capacitor has a charge accumulation effect. In this case, the OLT is likely to fail to set a correct determining threshold after the OLT receives an uplink optical signal. Therefore, the OLT needs to generate the reset signal before the to-perform-sending ONU sends the optical signal. For example, the OLT generates a reset signal each time after receiving an uplink optical signal. The reset signal is used to trigger the optical receiving component to perform the reset operation, that is, perform grounding discharging on a capacitor in a designated part of the optical receiving component, to remove a charge. For example, discharging is performed on capacitors in a TIA and an amplitude limiting amplifier, so that a correct determining threshold can be set when an optical signal is received next time.

S203. Adjust a Signal Characteristic of the Reset Signal According to the Transmission Rate, to Generate an Adjusted Signal.

Because the OLT cannot directly receive transmission rate information of the to-perform-sending ONU, the transmission rate information of the to-perform-sending ONU is loaded onto the reset signal in this application. Specifically, the signal characteristic of the reset signal is adjusted according to the transmission rate, to generate the adjusted signal. The signal characteristic may be one or more of a signal amplitude, a signal phase, or a bit width.

S204. Extract a Signal Characteristic of the Adjusted Signal, and Generate a First Signal and a Second Signal According to the Signal Characteristic of the Adjusted Signal.

The first signal is used to indicate the reset signal, and the second signal is used to indicate the transmission rate of the to-perform-sending ONU. The first signal and the second signal may be high-level signals. A signal characteristic of the first signal is a fixed value. For example, the first signal represents a high-level signal of 6.4-ns duration. A signal characteristic of the second signal may be different from that of the first signal. The signal characteristic of the second signal varies with the transmission rate. For example, when the transmission rate is 5 G, the second signal represents a high-level signal of 12.8-ns duration; or when the transmission rate is 10 G, the second signal represents a high-level signal of 19.2-ns duration.

S205. Perform a Reset Operation According to the First Signal, and After the Reset Operation is Completed, Adjust a Reception Parameter of an OLT According to the Second Signal.

In the foregoing embodiment, when ONUs with multiple transmission rates coexist, before the ONU sends the uplink optical signal, the OLT can adjust the reception parameter to meet a transmission rate requirement. In this way, the OLT can correctly receive the optical signal sent by the ONU, thereby improving optical signal receiving reliability.

Figures 1, 3A:
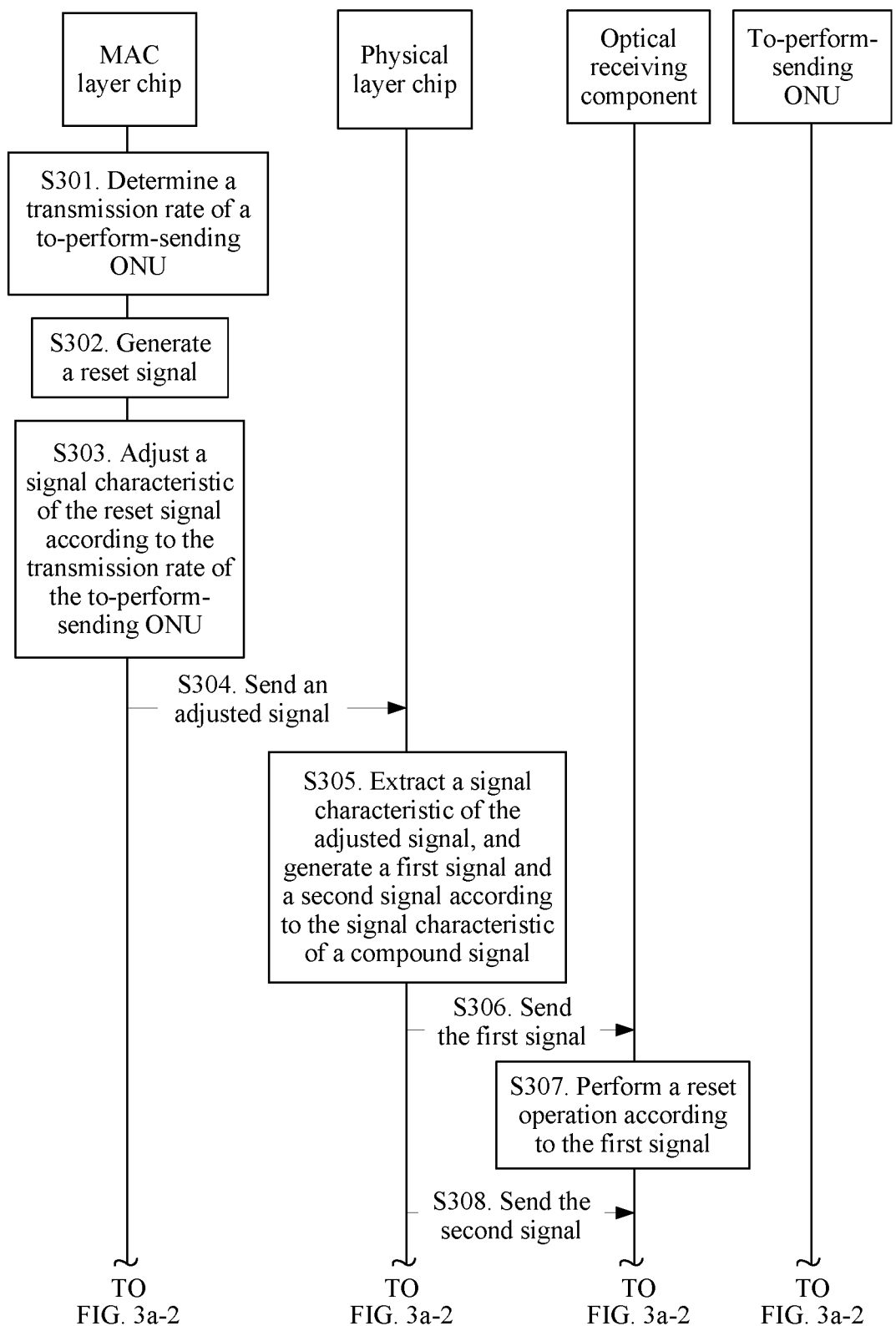
Figures 2, 3A:
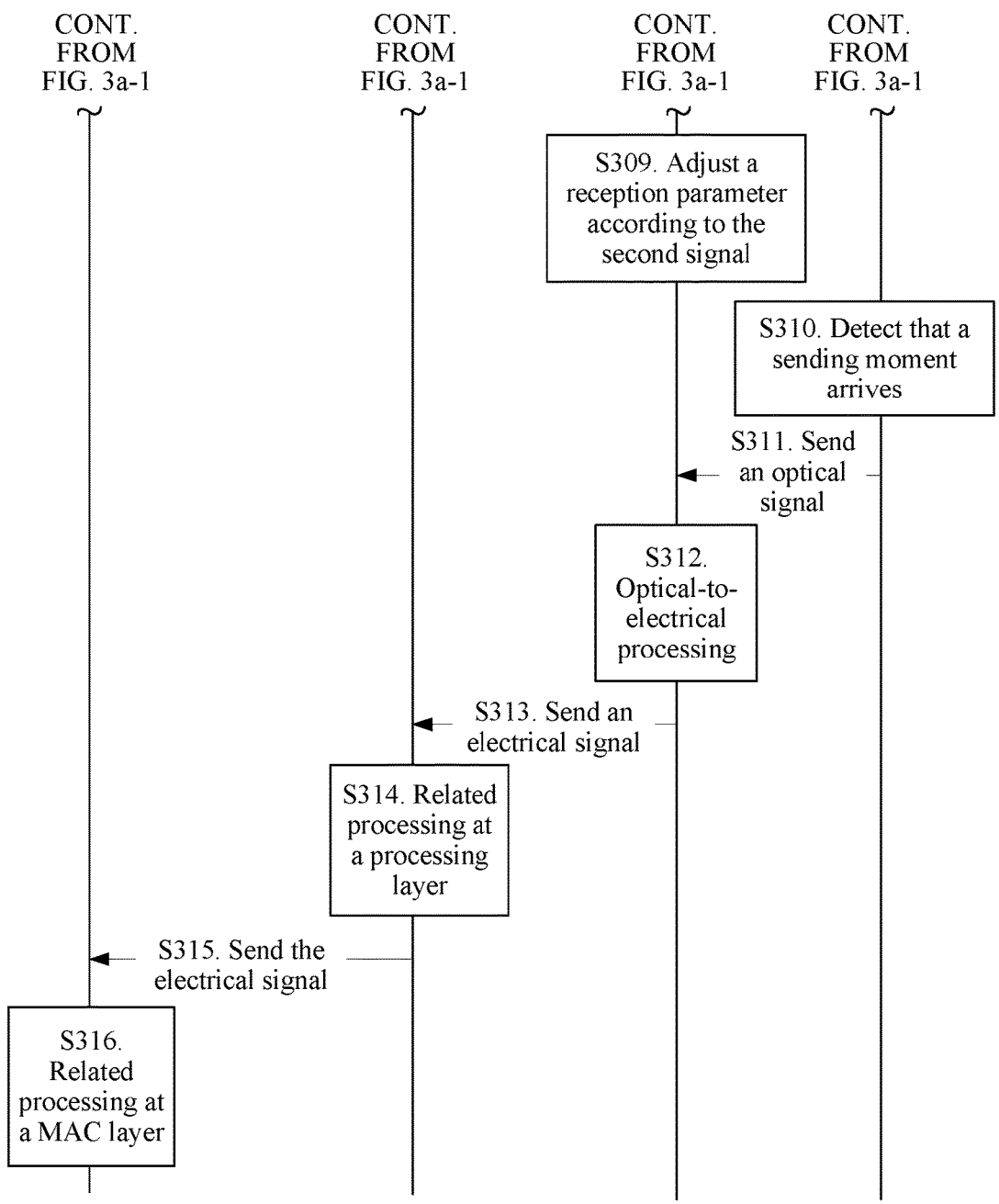

Referring to FIG. 3a-1 and FIG. 3a-2, FIG. 3a-1 and FIG. 3a-2 are another schematic flowchart of a method for adjusting a reception parameter of an optical line terminal according to an embodiment. In this embodiment, the OLT includes a MAC layer chip, a physical layer chip, and an optical receiving component. The MAC layer chip is connected to the physical layer chip, and the physical layer chip is connected to the optical receiving component. The method includes the following steps.

S301. The MAC Layer Chip Determines a Transmission Rate of a to-Perform-Sending ONU.

Specifically, the to-perform-sending ONU represents a to-perform-sending ONU next time based on a current moment. When the to-perform-sending ONU is in an online state, a method for obtaining, by the MAC layer chip, the transmission rate of the to-perform-sending ONU may be: The transmission rate of the to-perform-sending ONU is determined according to slot configuration information. When the to-perform-sending ONU is in an offline state, the MAC layer chip determines the transmission rate according to a network access time interval within which the current moment falls. The transmission rate includes a level signal.

In a possible implementation, multiple ONUs associated with the OLT are in an online state. For the multiple ONUs in an offline state, the to-perform-sending ONU is one of the multiple ONUs in an offline state. A method for determining, by the OLT, the transmission rate of the to-perform-sending ONU may be: Rate indication information is stored in the OLT. The rate indication information represents an association relationship between a device identifier of an ONU and a transmission rate. For example, the rate indication information may be represented by a rate indication table. A device identifier of an ONU and a transmission rate are stored in each entry in the rate indication table. The device identifier of the ONU may be a MAC address. The OLT may obtain a device identifier and a transmission rate of each ONU at an ONU registration stage. The slot configuration information is stored in the OLT. The slot configuration information represents a sending sequence (slot location) and sending duration (slot length) of the multiple ONUs. The OLT may determine, according to the slot configuration information, the to-perform-sending ONU, and query, according to the rate indication information, the transmission rate of the to-perform-sending ONU.

Figure 3B:
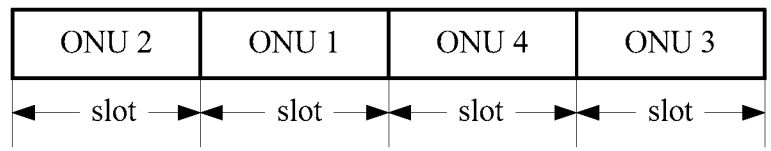
FIG. 3b is a schematic diagram of sending slot distribution of ONUs according to an embodiment of the present invention.

For example, as shown in FIG. 3b, the OLT is associated with four ONUs: an ONU 1, an ONU 2, an ONU 3, and an ONU 4. Transmission rates that are of the four ONUs and that are indicated by the rate indication information stored in the OLT are a transmission rate 1.25 G of the ONU 1, a transmission rate 5 G of the ONU 2, a transmission rate 10 G of the ONU 3, and a transmission rate 5 G of the ONU 4. The slot configuration information configured by the OLT is shown in FIG. 3b. A sending sequence of the four ONUs may be obtained according to the slot configuration information: ONU 2-→ONU 1-→ONU 4-→ONU 3-→ONU 2-→ONU 1-→ONU 4-→ONU3, and so on. Assuming that the four ONUs are just powered on in an initial state, the OLT may determine that the to-perform-sending ONU is the ONU 2 according to the slot configuration information in FIG. 3, and learn, by performing a query, that the transmission rate of the ONU 2 is 5 G according to the rate indication information. After receiving an optical signal sent by the ONU 3, the OLT may determine that the to-perform-sending ONU is the ONU 2 according to the slot configuration information in FIG. 3b, and then learn, by performing a query, that the transmission rate of the ONU 2 is 5 G according to the rate indication information.

In a possible implementation of this application, multiple ONUs associated with the OLT are in an offline state. The multiple ONUs in an offline state need to access a network. The to-perform-sending ONU is one of the multiple ONUs in an offline state. A method for determining, by the OLT, the transmission rate of the to-perform-sending ONU and that is in an offline state may be: The OLT sets network access time intervals whose quantity is the same as a quantity of types of transmission rates of the multiple ONUs. The OLT broadcasts a network access instruction message to the multiple ONUs before the network access time intervals start. The network access instruction message carries a start moment and an end moment of each network access time interval and a transmission rate, so that only an ONU with a designated transmission rate is allowed to access a network in each network access time interval. The OLT determines a network access time interval within which a current moment falls, and determines, according to a transmission rate associated with the network access time interval, the transmission rate of the to-perform-sending ONU.

Figure 3C:
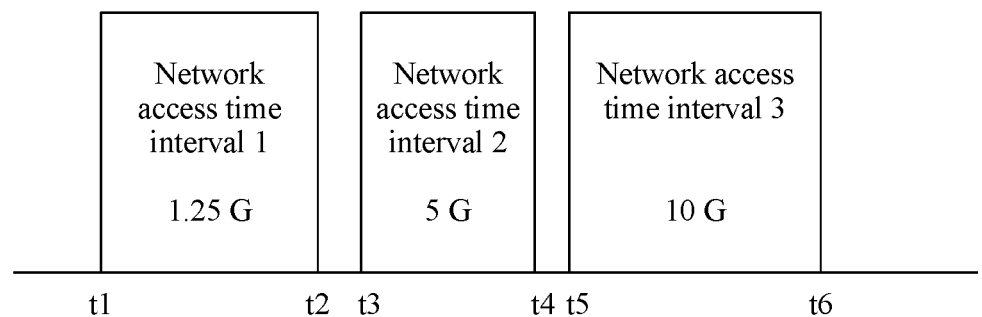
FIG. 3c is a schematic diagram of distribution of network access time intervals of ONUs according to an embodiment of the present invention.

For example, as shown in FIG. 3c, the OLT determines that the multiple ONUs in an offline state have three transmission rates: 1.25 G, 5 G, and 10 G. The OLT configures three network access time intervals, and configures a start moment and an end moment of each network access time interval and a transmission rate associated with each network access time interval. There may be specific duration between the network access time intervals. Specifically, duration of a network access time interval 1 is from t1 to t2, and a corresponding transmission rate is 1.25 G; duration of a network access time interval 2 is from t3 to t4, and a corresponding transmission rate is 5 G; and a network access time interval of a network access time interval 3 is from t5 to t6. Before the first network access time interval 1 starts (at a moment t1), the OLT may notify all the ONUs with network access configuration information of the network access time intervals in a broadcast manner. The ONU can access a network only in a corresponding network access time interval. Assuming that the multiple ONUs in an offline state are an ONU 1, an ONU 2, an ONU 3, and an ONU 4, a transmission rate of the ONU 1 is 1.25 G, a transmission rate of the ONU 2 is 5 G, a transmission rate of the ONU 3 is 10 G, and a transmission rate of the ONU 4 is 5 G, the ONU 1 accesses a network in the network access time interval 1, the ONU 2 and the ONU 4 access a network in the network access time interval 2, and the ONU 3 accesses a network in the network access time interval 3. The OLT determines, according to a correspondence between a network access time interval and a transmission rate, a transmission rate that is of the to-perform-sending ONU and that is in the network access time interval.

S 302. The MAC Layer Chip Generates a Reset Signal.

Specifically, some parts of the optical receiving component of the OLT include capacitors. The capacitor has a charge accumulation effect. In this case, the OLT is likely to fail to set a correct determining threshold after the OLT receives an uplink optical signal. Therefore, the MAC layer chip needs to generate the reset signal before the to-perform-sending ONU sends the optical signal. For example, the MAC layer chip generates a reset signal each time after an uplink optical signal is received. The reset signal is used to trigger the optical receiving component to perform a reset operation, that is, perform grounding discharging on a capacitor in a designated part of the optical receiving component, to remove a charge. For example, discharging is performed on capacitors in a TIA and an amplitude limiting amplifier, so that a correct determining threshold can be set when an optical signal is received next time.

S303. The MAC Layer Chip Adjusts an Amplitude of the Reset Signal According to the Transmission Rate of the to-Perform-Sending ONU, to Generate an Adjusted Signal.

Specifically, the MAC layer chip adjusts the signal characteristic of the reset signal according to the transmission rate, to generate the adjusted signal. The signal characteristic includes one or more of a signal amplitude, a bit width, or an impulse quantity. The amplitude represents a level value of the reset signal, the bit width represents duration of the reset signal, and the impulse quantity represents a quantity of unit impulses in the reset signal. The generated adjusted signal carries transmission rate information of the to-perform-sending ONU.

In a possible implementation of this embodiment, the adjusting, by the MAC layer chip, a characteristic of the reset signal according to the transmission rate, to generate an adjusted signal includes: querying, by the MAC layer chip according to a preset first mapping relationship, an amplitude associated with the transmission rate, and adjusting an amplitude of the reset signal according to the associated amplitude, to generate the adjusted signal.

Specifically, the first mapping relationship represents a correspondence between a transmission rate and an amplitude. Different transmission rates are corresponding to different amplitudes. The first mapping relationship may be represented by a mapping table, and each entry in the mapping table stores one transmission rate and one amplitude. After determining the transmission rate of the to-perform-sending ONU, the MAC layer chip queries, according to the first mapping relationship, the amplitude associated with the transmission rate of the to-perform-sending ONU, and adjusts the amplitude of the reset signal to the queried amplitude, to generate the adjusted signal.

For example, the preset first mapping relationship is shown in Table 1. Multiple ONUs associated with the MAC layer chip have three transmission rates: 1.25 G, 2.5 G, and 10 G, and the amplitude of the reset signal is A. When the MAC layer chip determines that the transmission rate of the to-perform-sending ONU is 1.25 G, the MAC layer chip learns, by performing a query in Table 1, that an amplitude associated with the transmission rate 1.25 G of the to-perform-sending ONU is A/2, and the MAC layer chip adjusts the amplitude of the reset signal to A/2, to generate the adjusted signal. When the MAC layer chip determines that the transmission rate of the to-perform-sending ONU is 2.5 G, the MAC layer chip learns, by performing a query in Table 1, that an associated amplitude is A, and the MAC layer chip keeps the amplitude of the reset signal unchanged, that is, an amplitude of the adjusted signal is A. When the MAC layer chip determines that the transmission rate of the to-perform-sending ONU is 10 G, the MAC layer chip learns, by performing a query in Table 1, that an associated amplitude is 3 A/2, and the MAC layer chip adjusts the amplitude of the reset signal to 3 A/2, to generate the adjusted signal.

TABLE 1

| Transmission rate | Amplitude |
| --- | --- |
| 1.25 G | A/2 |
| 2.5 G | A |
| 10 G | 3A/2 |

It should be understood that the foregoing example is merely a specific embodiment, and in another alternative embodiment, the mapping relationship between a transmission rate and an amplitude in Table 1 may be changed, so that the amplitude of the reset signal is adjusted according to another mapping relationship, to obtain the adjusted signal.

In a possible implementation of this embodiment, the adjusting, by the MAC layer chip, a characteristic of the reset signal according to the transmission rate, to generate an adjusted signal includes: querying, by the MAC layer chip according to a preset second mapping relationship, a bit width associated with the transmission rate, and adjusting a bit width of the reset signal according to the associated bit width, to generate the adjusted signal.

Specifically, the second mapping relationship represents a correspondence between a transmission rate and a bit width. Different transmission rates are corresponding to different bit widths. The second mapping relationship may be represented by a mapping table, and each entry in the mapping table stores one transmission rate and one bit width. After determining the transmission rate of the to-perform-sending ONU, the MAC layer chip queries, according to the second mapping relationship, the bit width corresponding to the transmission rate of the to-perform-sending ONU, and updates the bit width of the reset signal according to the queried bit width, to generate the adjusted signal.

For example, the second mapping relationship is shown in Table 2. ONUs associated with the OLT have three transmission rates: 1.25 G, 2.5 G, and 10 G, and the bit width of the reset signal is B. When the MAC layer chip determines that the transmission rate of the to-perform-sending ONU is 1.25 G, the MAC layer chip learns, by performing a query in Table 2, that a bit width associated with the transmission rate 1.25 G is B/2, and the MAC layer chip adjusts the bit width of the reset signal to B/2, to generate the adjusted signal. When the MAC layer chip determines that the transmission rate of the to-perform-sending ONU is 2.5 G, the MAC layer chip learns, by performing a query in Table 2, that a bit width associated with the transmission rate 2.5 G is B, and the MAC layer chip may keep the bit width of the reset signal unchanged, that is, a bit width of the adjusted signal is B. When the MAC layer chip determines that the transmission rate of the to-perform-sending ONU is 10 G, the MAC layer chip learns, by performing a query in Table 2, that a bit width associated with the transmission rate 10 G is 3B/2, and the MAC layer chip adjusts the bit width of the reset signal to 3B/2, to generate the adjusted signal.

TABLE 2

| Transmission rate | Bit width |
| --- | --- |
| 1.25 G | B/2 |
| 2.5 G | B |
| 10 G | 3B/2 |

It should be understood that the foregoing example is merely a specific embodiment, and in another alternative embodiment, the mapping relationship between a transmission rate and a bit width in Table 2 may be changed, so that the bit width of the reset signal is adjusted according to another mapping relationship, to obtain the adjusted signal.

In a possible implementation of this embodiment, the adjusting, by the MAC layer chip, a characteristic of the reset signal according to the transmission rate, to generate an adjusted signal includes: querying, by the MAC layer chip according to the preset third mapping relationship, an impulse quantity associated with the transmission rate, and adjusting an impulse quantity of the reset signal according to the associated impulse quantity, to generate the adjusted signal.

Specifically, the impulse quantity represents a quantity of unit impulses in the reset signal, and the unit impulse is a high-level impulse signal. The MAC layer chip may preset a mapping relationship between a transmission rate and an impulse quantity, and different transmission rates are corresponding to different impulse quantities. After determining the transmission rate of the to-perform-transmission ONU, the MAC layer chip determines, according to the mapping relationship between a transmission rate and an impulse quantity, the impulse quantity corresponding to the transmission rate, and adjusts the impulse quantity of the reset signal according to the impulse quantity, to generate the adjusted signal.

For example, the third mapping relationship is shown in Table 3. Multiple ONUs associated with the OLT have three transmission rates: 1.25 G, 2.5 G, and 10 G. When the MAC layer chip determines that the transmission rate of the to-perform-sending ONU is 1.25 G, the MAC layer chip determines that an impulse quantity is 3 according to the mapping relationship in Table 3, and the MAC layer chip sets three unit impulses in the reset signal, to generate the adjusted signal. Two neighboring unit impulses are spaced by one unit time. When the MAC layer chip determines that the transmission rate of the to-perform-sending ONU is 2.5 G, the MAC layer chip determines that an impulse quantity is 2 according to the mapping relationship in Table 3, and the MAC layer chip sets two unit impulses in the reset signal, to generate the adjusted signal. When the MAC layer chip determines that the transmission rate of the to-perform-sending ONU is 10 G, the MAC layer chip determines that an impulse quantity is 1 according to the mapping relationship in Table 3, and the MAC layer chip sets one unit impulse in the reset signal, to generate the adjusted signal.

TABLE 3

| Transmission rate | Impulse quantity |
|---|---|
| 1.25 G | 3 |
| 2.5 G | 2 |
| 10 G | 1 |

It should be understood that the foregoing example is merely a specific embodiment, and in another alternative embodiment, the mapping relationship between a transmission rate and an impulse quantity in Table 3 may be changed, so that the impulse quantity of the reset signal is adjusted according to another mapping relationship, to obtain the adjusted signal.

S304. The MAC Layer Chip Sends the Adjusted Signal to the Physical Layer Chip.

Specifically, the MAC layer chip is connected to the physical layer chip. The MAC layer chip may send the adjusted signal to the physical layer chip by using a pin originally used to transmit a reset signal, so that an extra pin of the MAC layer chip can be prevented from being occupied, and a connection relationship between the MAC layer chip and the physical layer chip does not need to be changed.

S305. The Physical Layer Chip Extracts a Signal Characteristic of the Adjusted Signal, and Generates a First Signal and a Second Signal According to the Signal Characteristic of the Adjusted Signal.

Specifically, the physical layer chip receives the adjusted signal by using a designated pin. A type of the signal characteristic that is of the adjusted signal and that is extracted by the physical layer chip depends on the MAC layer chip, and needs to be consistent with that of a signal characteristic adjusted by the MAC layer chip. The signal characteristic includes one or more of a signal amplitude, a phase, a bit width, or an impulse quantity. The transmission rate of the to-perform-sending ONU is obtained according to a mapping relationship between a signal characteristic and a transmission rate, and the first signal that indicates the reset signal and the second signal that indicates the transmission rate of the to-perform-sending ONU are generated. The first signal and the second signal may be high-level signals. A signal characteristic of the first signal is a fixed value. For example, the first signal represents a high-level signal of 6.4-ns duration. A signal characteristic of the second signal may be different from that of the first signal. The signal characteristic of the second signal varies with the transmission rate. For example, when the transmission rate is 5 G, the second signal represents a high-level signal of 12.8-ns duration; or when the transmission rate is 10 G, the second signal represents a high-level signal of 19.2-ns duration.

In a possible implementation of this embodiment, the extracting, by the physical layer chip, a signal characteristic of the adjusted signal, and generating a first signal and a second signal according to the signal characteristic of the adjusted signal includes:

extracting an amplitude of the adjusted signal, and querying, according to the preset first mapping relationship, a transmission rate associated with the amplitude of the adjusted signal, so as to generate the first signal and the second signal.

Specifically, the MAC layer chip sends the adjusted signal to the physical layer chip. The physical layer chip receives the adjusted signal, obtains the amplitude of the adjusted signal, determines a transmission rate corresponding to the amplitude according to the first mapping relationship, and generates the first signal that indicates the reset signal and the second signal that indicates the transmission rate of the to-perform-sending ONU. For example, the physical layer chip obtains, according to the mapping relationship in Table 1, the transmission rate of the to-perform-sending ONU. Because the amplitude of the reset signal is known to the physical layer chip, the physical layer chip may generate the first signal that indicates the reset signal, and generate the second signal according to the transmission rate of the to-perform-sending ONU. It should be noted that the amplitude of the adjusted signal may fluctuate in a transmission process. When the physical layer chip learns, by means of measurement, that the amplitude of the adjusted signal falls within a preset error range, the physical layer chip considers that the amplitude is equal to a central value of the error range. For example, the physical layer chip learns, by means of measurement, that the amplitude of the adjusted signal is X. If X falls within an error range of [0.95A, 1.05A], that is, $0.95*A \leq X \leq 1.05A$, and a central value of the error range is A, the physical layer chip considers that X=A.

In a possible implementation of this embodiment, the extracting, by the physical layer chip, a signal characteristic of the adjusted signal, and generating a first signal and a second signal according to the signal characteristic of the adjusted signal includes:

extracting a bit width of the adjusted signal, and querying, according to the second mapping relationship, a transmission rate associated with the bit width of the adjusted signal, so as to generate the first signal and the second signal.

Specifically, the MAC layer chip sends the adjusted signal to the physical layer chip. The physical layer chip receives the adjusted signal, obtains the bit width of the adjusted signal, determines a transmission rate corresponding to the bit width according to the second mapping relationship, and generates the first signal that indicates the reset signal and the second signal that indicates the transmission rate of the to-perform-sending ONU. For example, the physical layer chip obtains, according to the mapping relationship in Table 2, the transmission rate of the to-perform-sending ONU. Because the bit width of the reset signal is known to the physical layer chip, the physical layer chip may generate the first signal that indicates the reset signal, and generate the second signal according to the transmission rate of the to-perform-sending ONU. It should be noted that the bit width of the adjusted signal may fluctuate in a transmission process. When the physical layer chip learns, by means of measurement, that the bit width of the adjusted signal falls within a preset error range, the physical layer chip considers that the bit width is equal to a central value of the error range. For example, the physical layer chip learns, by means of measurement, that the bit width of the adjusted signal is Y. If Y falls within an error range of [0.95B, 1.05B], that is, $0.95*B \leq Y \leq 1.05*B$, and a central value of the error range is B, the physical layer chip considers that Y=B.

In a possible implementation of this embodiment, the extracting, by the physical layer chip, a signal characteristic of the adjusted signal, and generating a first signal and a second signal according to the signal characteristic of the adjusted signal includes:

extracting an impulse quantity of the adjusted signal, and querying, according to the third mapping relationship, a transmission rate associated with the impulse quantity of the adjusted signal, so as to generate the first signal and the second signal.

Specifically, the MAC layer chip sends the adjusted signal to the physical layer chip. The physical layer chip receives the adjusted signal, obtains the impulse quantity of the adjusted signal, and determines, according to the mapping relationship between an impulse quantity and a transmission rate, the transmission rate corresponding to the impulse quantity. For example, the physical layer chip obtains, according to the mapping relationship in Table 3, the transmission rate of the to-perform-sending ONU. The signal characteristic of the reset signal is known to the MAC layer chip and the physical layer chip. Therefore, the physical layer chip demodulates the adjusted signal, to generate the first signal that indicates the reset signal, and generate the second signal that indicates the transmission rate of the to-perform-sending ONU.

It should be noted that, a method for loading the transmission rate onto the reset signal by the MAC layer chip is not limited to a manner of an amplitude, a bit width, or an impulse quantity. The transmission rate may be loaded onto the reset signal by combining two or more of an amplitude, a bit width, or an impulse quantity. A specific process is not described herein.

S306. The Physical Layer Chip Sends the First Signal to the Optical Receiving Component.

Specifically, the physical layer chip is connected to the optical receiving component, and the physical layer chip sends the first signal to the optical receiving component by using a designated pin.

S307. The Optical Receiving Component Performs a Reset Operation According to the First Signal.

Specifically, the optical receiving component performs short-circuit discharging on a capacitor in a designated part according to an instruction of the first signal, so that a correct determining threshold can be set when an optical signal is received next time. For example, the TIA and the amplitude limiting amplifier of the optical receiving component perform discharging on capacitors according to the first signal to eliminate charge accumulation. The first signal may be a high-level signal, and the signal characteristic of the first signal is a fixed value. For example, the first signal represents a high-level signal of 6.4-ns duration.

S308. The Physical Layer Chip Sends the Second Signal to the Optical Receiving Component.

The second signal is used to indicate the transmission rate of the to-perform-sending ONU. A quantity of levels and a value of the level in the second signal represent different transmission rates. For example, 00 represents a transmission rate 1.25 G, 01 represents a transmission rate 5 G, and 10 represents a transmission rate 10 G. The second signal may be a high-level signal, and the signal characteristic of the second signal may be different from that of the first signal. The signal characteristic of the second signal varies with the transmission rate. For example, when the transmission rate is 5 G, the second signal represents a high-level signal of 12.8-ns duration; or when the transmission rate is 10 G, the second signal represents a high-level signal of 19.2-ns duration.

S309. The Optical Receiving Component Adjusts a Reception Parameter According to the Second Signal.

Specifically, the optical receiving component includes a photoelectric detector, the trans-impedance amplifier TIA, and the amplitude limiting amplifier. The photoelectric detector is configured to convert a received optical signal into a current signal, the TIA is configured to convert the current signal into a voltage signal, and the amplitude limiting amplifier is configured to perform amplitude limiting amplification processing on the voltage signal. The receiving, by the optical receiving component, a reception parameter according to the second signal may be: determining, by the TIA according to the second signal, the transmission rate of the to-perform-sending ONU, and adjusting impedance and bandwidth of the TIA according to the transmission rate; or adjusting, by the amplitude limiting amplifier, a gain and bandwidth of the amplitude limiting amplifier according to the transmission rate. In this way, a reception parameter of each part of the optical receiving component matches the transmission rate.

S310. The to-perform-sending ONU detects that a sending moment arrives.

S311. The to-perform-sending ONU sends an optical signal to the optical receiving component.

When detecting, according to preset slot configuration information or network access window configuration information, that the sending moment arrives, the to-perform-sending ONU sends the optical signal to the optical receiving component.

S312. The optical receiving component performs optical-to-electrical processing on the received optical signal, to obtain an electrical signal.

Specifically, the optical receiving component performs optical-to-electrical conversion on the optical signal, to obtain a current signal, converts the current signal into a voltage signal, performs amplitude limiting processing on the voltage signal, and sends the voltage signal obtained after the amplitude limiting processing to a physical layer signal.

S313. The optical receiving component sends the electrical signal to the physical layer chip.

S314. The physical layer chip receives the electrical signal, and performs processing according to a physical layer protocol.

The physical layer protocol is mainly used for encoding, decoding, redundancy control, error control, and the like.

S315. The physical layer chip sends the processed electrical signal to the MAC layer chip.

S316. The MAC layer chip receives the electrical signal, and performs processing according to a MAC layer protocol.

The MAC layer protocol is mainly used for access control, power control, and the like.

In the foregoing embodiment, when ONUs with multiple transmission rates coexist, before the ONU sends the uplink optical signal, the MAC layer chip can adjust the signal characteristic of the reset signal, to generate the adjusted signal for representing the transmission rate of the to-perform-sending ONU. In this way, the adjusted signal can be transmitted by using the pin originally used to transmit a reset signal, and no extra chip pin is occupied. The physical layer chip demodulates the adjusted signal to obtain the reset signal and the signal that indicates the transmission rate. The optical receiving component adjusts the reception parameter according to the transmission rate, which is notified by the physical layer chip, of the to-perform-sending ONU, so that the reception parameter matches the transmission rate. In this way, the OLT can correctly receive the optical signal sent by the ONU, thereby improving optical signal receiving reliability.

Figure 4:
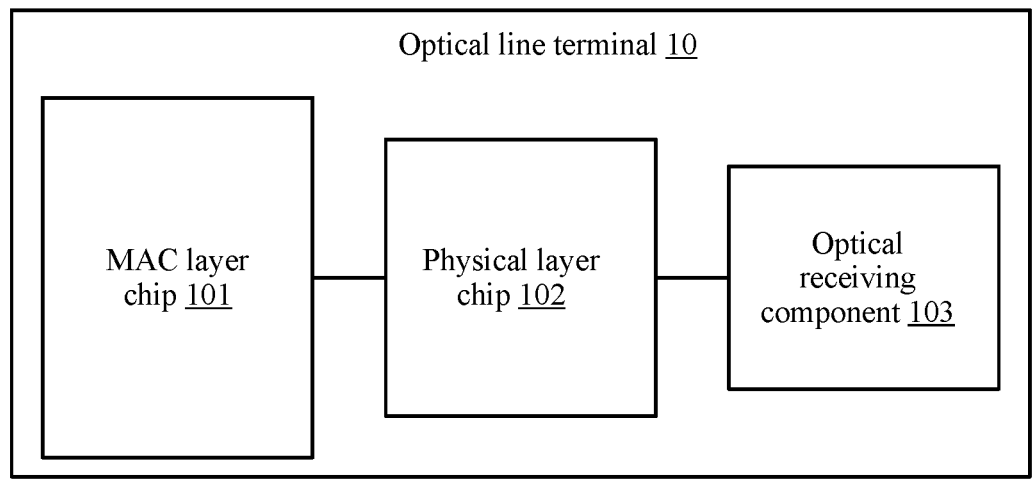
FIG. 4 is a schematic structural diagram of an OLT according to an embodiment of the present invention.

Referring to FIG. 4, FIG. 4 is a schematic structural diagram of an optical line terminal according to an embodiment of the present invention. In this embodiment of the present invention, an optical line terminal 10 includes a MAC layer chip 101, a physical layer chip 102, and an optical receiving component 103.

The MAC layer chip 101 is configured to: determine a transmission rate of a to-perform-sending optical network unit ONU, generate a reset signal before the to-perform-sending ONU sends an optical signal, adjust a signal characteristic of the reset signal according to the transmission rate, to generate an adjusted signal, and send the adjusted signal to the physical layer chip, where the reset signal is used to trigger the optical receiving component to perform a reset operation, and the transmission rate includes a level signal.

The physical layer chip 102 is configured to: receive the adjusted signal sent by the MAC layer chip, extract a signal characteristic of the adjusted signal, generate a first signal and a second signal according to the signal characteristic of the adjusted signal, send the first signal to the optical receiving component, and send the second signal to the optical receiving component after the optical receiving component completes the reset operation, where the first signal indicates the reset signal, and the second signal indicates the transmission rate of the to-perform-sending ONU.

The optical receiving component 103 is configured to: receive the first signal and the second signal that are sent by the physical layer chip, perform the reset operation according to the first signal, and after completing the reset operation, adjust a reception parameter according to the second signal.

This embodiment and the method embodiment 1 in FIG. 2 are based on a same concept, and technical effects brought by this embodiment and the method embodiment 1 in FIG. 2 are also the same. For a specific process, refer to descriptions in the method embodiment 1, and details are not described herein again.

In the foregoing embodiment, when ONUs with multiple transmission rates coexist, before the ONU sends data, the OLT can adjust the reception parameter to meet a transmission rate requirement of the ONU. In this way, the OLT can correctly receive the data sent by the ONU, thereby improving data receiving reliability.

Figure 5:
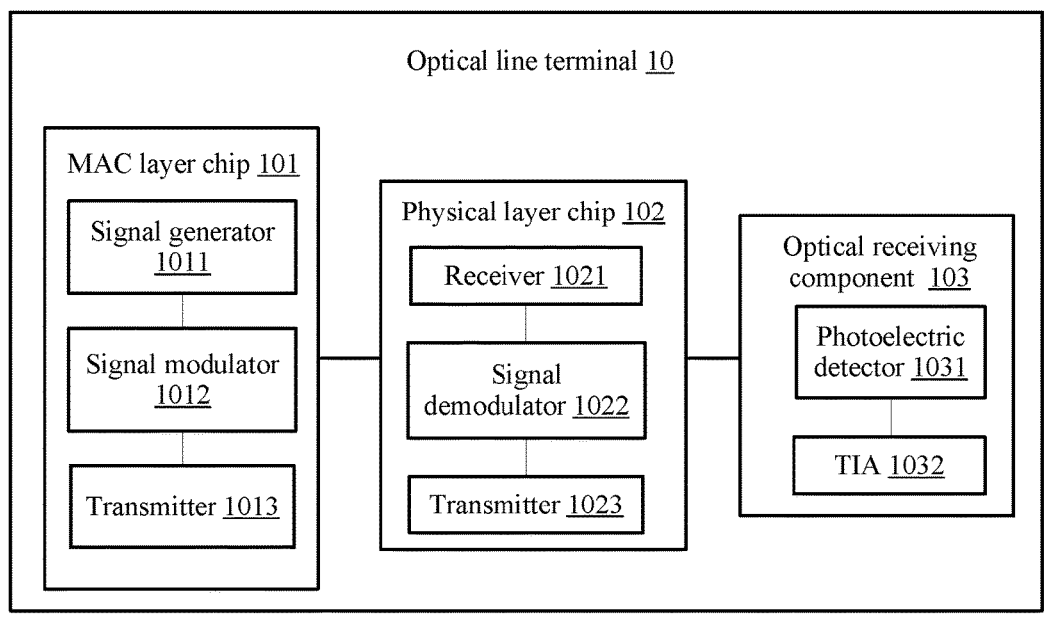
FIG. 5 is another schematic structural diagram of an OLT according to an embodiment of the present invention.

Referring to FIG. 5, FIG. 5 is another schematic structural diagram of an optical line terminal according to an embodiment of the present invention. In this embodiment, an optical line terminal 10 includes a MAC layer chip 101, a physical layer chip 102, and an optical receiving component 103. The MAC layer chip 101 includes a signal generator 1011, a signal modulator 1012, and a transmitter 1013, the physical layer chip 102 includes a receiver 1021, a signal demodulator 1022, and a transmitter 1023, and the optical receiving component 103 includes a photoelectric detector 1031 and a TIA 1032.

The signal generator 1011 of the MAC layer chip 101 is configured to: determine a transmission rate of a to-perform-sending optical network unit ONU, and generate a reset signal before an optical signal sent by the to-perform-sending ONU is received, where the reset signal is used to instruct the photoelectric detector 1031 and the TIA 1032 of the optical receiving component 103 to perform a reset operation, and the transmission rate includes a level signal.

The signal modulator 1012 of the MAC layer chip 101 is configured to adjust a signal characteristic of the reset signal according to the transmission rate, to generate an adjusted signal.

The transmitter 1013 of the MAC layer chip 101 is configured to send the adjusted signal to the receiver 1021 of the physical layer chip 102.

The receiver 1021 of the physical layer chip 102 is configured to receive the adjusted signal.

The signal demodulator 1022 of the physical layer chip 102 is configured to: extract a signal characteristic of the adjusted signal, and generate a first signal and a second signal according to the signal characteristic of the adjusted signal, where the first signal indicates the reset signal, and the second signal indicates the transmission rate of the to-perform-sending ONU.

The transmitter 1023 of the physical layer chip 102 is configured to: send the first signal to the TIA 1032 of the optical receiving component 103, and send the second signal to the TIA 1032 of the optical receiving component 103 after the TIA 1031 of the optical receiving component 103 completes the reset operation.

The TIA 1032 of the optical receiving component 103 is configured to: receive the first signal and the second signal, perform the reset operation according to the first signal, and after completing the reset operation, adjust impedance and bandwidth according to the second signal.

The photoelectric detector 1031 of the optical receiving component 103 is configured to: receive the optical signal sent by the to-perform-sending ONU, convert the optical signal into an electrical signal, and send the electrical signal to the TIA 1032.

In a possible implementation of this embodiment, the modulator 1012 of the MAC layer chip 101 is configured to:

query, according to a preset first mapping relationship, an amplitude associated with the transmission rate, and adjust an amplitude of the reset signal according to the associated amplitude, to generate the adjusted signal; or query, according to a preset second mapping relationship, a bit width associated with the transmission rate, and adjust a bit width of the reset signal according to the associated bit width, to generate the adjusted signal; or query, according to a preset third mapping relationship, an impulse quantity associated with the transmission rate, and adjust an impulse quantity of the reset signal according to the associated impulse quantity, to generate the adjusted signal.

In a possible implementation of this embodiment, the modulator 1012 of the MAC layer chip 101 is configured to:

query, according to a preset mapping relationship, a signal characteristic associated with the transmission rate, and adjust the signal characteristic of the reset signal according to the associated signal characteristic, to generate the adjusted signal, where the associated signal characteristic includes one or more of an amplitude, a bit width, or an impulse quantity.

In a possible implementation of this embodiment, the signal demodulator 1022 of the physical layer chip 102 is configured to:

extract an amplitude of the adjusted signal, and query, according to the first mapping relationship, a transmission rate associated with the amplitude of the adjusted signal, so as to generate the first signal and the second signal; or extract a bit width of the adjusted signal, and query, according to the second mapping relationship, a transmission rate associated with the bit width of the adjusted signal, so as to generate the first signal and the second signal; or extract an impulse quantity of the adjusted signal, and query, according to the third mapping relationship, a transmission rate associated with the impulse quantity of the adjusted signal, so as to generate the first signal and the second signal.

In a possible implementation of this embodiment, the signal generator 1011 of the MAC layer chip 101 is configured to:

when the ONU that is to perform sending is in an online state, determine, according to preset slot configuration information, the transmission rate of the to-perform-sending ONU; or when an offline ONU needs to go online, determine a network access time interval within which a current moment falls, and determine, according to preset network access configuration information, a transmission rate that is associated with the network access time interval and that is of the to-perform-sending ONU.

This embodiment and the method embodiment 1 in FIG. 3a-1 and FIG. 3a-2 are based on a same concept, and technical effects brought by this embodiment and the method embodiment 1 in FIG. 3a-1 and FIG. 3a-2 are also the same. For a specific process, refer to descriptions in the method embodiment 1, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely an example of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A method for adjusting a reception parameter of an optical line terminal (OLT), comprising:
    determining a transmission rate of a to-perform-sending optical network unit (ONU);
    generating a reset signal before the to-perform-sending ONU sends an optical signal, wherein the reset signal is used to trigger the OLT to perform a reset operation;
    adjusting a signal characteristic of the reset signal according to the transmission rate, to generate an adjusted signal;
    extracting a signal characteristic of the adjusted signal, and generating a first signal and a second signal according to the signal characteristic of the adjusted signal, wherein the first signal indicates the reset signal, and the second signal indicates the transmission rate of the to-perform-sending ONU;
    performing the reset operation according to the first signal; and
    after the reset operation is completed, adjusting the reception parameter of the OLT according to the second signal,
    wherein the extracting the signal characteristic of the adjusted signal, and generating a first signal and a second signal comprises:
        receiving, by a physical layer chip, the adjusted signal sent by a Media Access Control (MAC) layer chip;
        extracting, by the physical layer chip, the signal characteristic of the adjusted signal, and generating the first signal and the second signal according to the signal characteristic of the adjusted signal;
        sending, by the physical layer chip, the first signal to an optical receiving component, wherein the first signal is used to trigger the optical receiving component to perform the reset operation; and
        after the optical receiving component completes the reset operation, sending, by the physical layer chip, the second signal to the optical receiving component.

2. The method according to claim 1, wherein the adjusting a signal characteristic of the reset signal according to the transmission rate, to generate an adjusted signal comprises:
    querying, according to a preset first mapping relationship, an amplitude associated with the transmission rate, and adjusting an amplitude of the reset signal according to the amplitude associated with the transmission rate, to generate the adjusted signal; or
    querying, according to a preset second mapping relationship, a bit width associated with the transmission rate, and adjusting a bit width of the reset signal according to the bit width associated with the transmission rate, to generate the adjusted signal; or
    querying, according to a preset third mapping relationship, an impulse quantity associated with the transmission rate, and adjusting an impulse quantity of the reset signal according to the impulse quantity associated with the transmission rate, to generate the adjusted signal.

3. The method according to claim 1, wherein the adjusting a signal characteristic of the reset signal according to the transmission rate, to generate an adjusted signal comprises:
    querying, according to a preset mapping relationship, a signal characteristic associated with the transmission rate, and adjusting the signal characteristic of the reset signal according to the signal characteristic associated with the transmission rate, to generate the adjusted signal, wherein the signal characteristic associated with the transmission rate comprises one or more of an amplitude, a bit width, or an impulse quantity.

4. The method according to claim 1, wherein the determining a transmission rate of a to-perform-sending optical network unit (ONU) comprises:
    when the ONU that is to perform sending is in an online state, determining, according to preset slot configuration information, the transmission rate of the to-perform-sending ONU; or when an offline ONU needs to go online, determining a network access time interval within which a current moment falls, and determining, according to preset network access configuration information, a transmission rate that is associated with the network access time interval and that is of the to-perform-sending ONU.

5. An optical line terminal, comprising an optical receiving component, a Media Access Control (MAC) layer chip, and a physical layer chip, wherein
    the MAC layer chip is configured to: determine a transmission rate of a to-perform-sending optical network unit (ONU), generate a reset signal before the to-perform-sending ONU sends an optical signal, adjust a signal characteristic of the reset signal according to the transmission rate, to generate an adjusted signal, and send the adjusted signal to the physical layer chip, wherein the reset signal is used to trigger the optical receiving component to perform a reset operation;
    the physical layer chip is configured to: receive the adjusted signal sent by the MAC layer chip, extract a signal characteristic of the adjusted signal, generate a first signal and a second signal according to the signal characteristic of the adjusted signal, send the first signal to the optical receiving component, and after the optical receiving component completes the reset operation, send the second signal to the optical receiving component, wherein the first signal indicates the reset signal, and the second signal indicates the transmission rate of the to-perform-sending ONU; and the optical receiving component is configured to: receive the first signal and the second signal that are sent by the physical layer chip, perform the reset operation according to the first signal, and after completing the reset operation, adjust a reception parameter according to the second signal.

6. The optical line terminal according to claim 5, wherein the MAC layer chip comprises a signal generator, a signal modulator, and a transmitter, the physical layer chip comprises a receiver, a signal demodulator, and a transmitter, and the optical receiving component comprises a photoelectric detector and a trans-impedance amplifier (TIA);

the signal generator of the MAC layer chip is configured to: determine the transmission rate of the optical network unit to-perform-sending ONU, and generate the reset signal before the optical signal sent by the to-perform-sending ONU is received, wherein the reset signal is used to trigger the photoelectric detector and the TIA of the optical receiving component to perform the reset operation;

the signal modulator of the MAC layer chip is configured to adjust the signal characteristic of the reset signal according to the transmission rate, to generate the adjusted signal;

the transmitter of the MAC layer chip is configured to send the adjusted signal to the receiver of the physical layer chip;

the receiver of the physical layer chip is configured to receive the adjusted signal;

the signal demodulator of the physical layer chip is configured to: extract the signal characteristic of the adjusted signal, and generate the first signal and the second signal according to the signal characteristic of the adjusted signal;

the transmitter of the physical layer chip is configured to: send the first signal to the TIA of the optical receiving component, and after the TIA of the optical receiving component completes the reset operation, send the second signal to the TIA of the optical receiving component;

the TIA of the optical receiving component is configured to: receive the first signal and the second signal, perform the reset operation according to the first signal, and after completing the reset operation, adjust impedance and bandwidth according to the second signal; and the photoelectric detector of the optical receiving component is configured to: receive the optical signal sent by the to-perform-sending ONU, convert the optical signal into an electrical signal, and send the electrical signal to the TIA.

7. The optical line terminal according to claim 6, wherein the modulator of the MAC layer chip is configured to:

query, according to a preset first mapping relationship, an amplitude associated with the transmission rate, and adjust an amplitude of the reset signal according to the amplitude associated with the transmission rate, to generate the adjusted signal; or query, according to a preset second mapping relationship, a bit width associated with the transmission rate, and adjust a bit width of the reset signal according to the bit width associated with the transmission rate, to generate the adjusted signal; or query, according to a preset third mapping relationship, an impulse quantity associated with the transmission rate, and adjust an impulse quantity of the reset signal according to the impulse quantity associated with the transmission rate, to generate the adjusted signal.

8. The optical line terminal according to claim 7, wherein the modulator of the MAC layer chip is configured to:

query, according to a preset mapping relationship, a signal characteristic associated with the transmission rate, and adjust the signal characteristic of the reset signal according to the signal characteristic associated with the transmission rate, to generate the adjusted signal, wherein the signal characteristic associated with the transmission rate comprises one or more of an amplitude, a bit width, or an impulse quantity.

9. The optical line terminal according to claim 7, wherein the signal demodulator of the physical layer chip is configured to:

extract an amplitude of the adjusted signal, and query, according to the first mapping relationship, a transmission rate associated with the amplitude of the adjusted signal, so as to generate the first signal and the second signal; or extract a bit width of the adjusted signal, and query, according to the second mapping relationship, a transmission rate associated with the bit width of the adjusted signal, so as to generate the first signal and the second signal; or extract an impulse quantity of the adjusted signal, and query, according to the third mapping relationship, a transmission rate associated with the impulse quantity of the adjusted signal, so as to generate the first signal and the second signal.

10. The optical line terminal according to claim 5, wherein the signal generator of the MAC layer chip is configured to:

when the to-perform-sending ONU is in an online state, determine, according to preset slot configuration information, the transmission rate of the to-perform-sending ONU; or when an offline ONU needs to go online, determine a network access time interval within which a current moment falls, and determine, according to preset network access configuration information, a transmission rate that is associated with the network access time interval and that is of the to-perform-sending ONU.

* * * * *